United States Patent
D'Amico, III

(10) Patent No.: US 12,297,947 B2
(45) Date of Patent: May 13, 2025

(54) HEAT TRACING SYSTEM AND METHOD

(71) Applicant: Joseph V. D'Amico, III, New Orleans, LA (US)

(72) Inventor: Joseph V. D'Amico, III, New Orleans, LA (US)

(*) Notice: Subject to any disclaimer, the term of this patent is extended or adjusted under 35 U.S.C. 154(b) by 0 days.

(21) Appl. No.: 18/620,034

(22) Filed: Mar. 28, 2024

(65) Prior Publication Data
US 2024/0328560 A1 Oct. 3, 2024

Related U.S. Application Data

(60) Provisional application No. 63/455,617, filed on Mar. 30, 2023.

(51) Int. Cl.
*F16L 53/30* (2018.01)
*F16L 59/02* (2006.01)
*G05D 7/06* (2006.01)

(52) U.S. Cl.
CPC .............. *F16L 53/30* (2018.01); *F16L 59/02* (2013.01); *G05D 7/0658* (2013.01)

(58) Field of Classification Search
CPC . F16L 53/30; F16L 53/32; F16L 53/70; F16L 59/02; G05D 7/0658
See application file for complete search history.

(56) References Cited

U.S. PATENT DOCUMENTS

| | | | | |
|---|---|---|---|---|
| 3,782,452 A | * | 1/1974 | Ceplon | F16L 59/13 219/535 |
| 3,955,601 A | * | 5/1976 | Plummer, III | F16L 59/08 138/168 |
| 4,016,901 A | | 4/1977 | Kenny | |
| 4,337,200 A | * | 6/1982 | Zweifel | C07D 209/70 548/451 |
| 4,401,156 A | * | 8/1983 | Wojtecki | F28F 9/013 165/172 |
| 5,368,063 A | | 11/1994 | Kida et al. | |
| 6,548,004 B2 | * | 4/2003 | Born | F16L 59/14 264/261 |

(Continued)

FOREIGN PATENT DOCUMENTS

CN 214405119 U 10/2021
CN 116045115 A 3/2023

(Continued)

OTHER PUBLICATIONS

Thermomegatech, Inc., US/S-X Steam Tracing Control Valve—Tracing System Control, https://www.thermomegatech.com/product/uss-x/ (accessed Mar. 14, 2023).

(Continued)

*Primary Examiner* — Tho V Duong
(74) *Attorney, Agent, or Firm* — Jones Walker LLP

(57) ABSTRACT

A heat tracing assembly for heating a product in a process pipe including a compression layer formed of a conductive material and one or more tracing tubes for the flow of a heat source. The compression layer is positioned around the process pipe with the tracing tubes at least partially disposed within the compression layer. The compression layer may be formed of a plurality of interlocking longitudinal panels for optimizing the transfer and distribution of heat from the tracing tubes to the process pipe.

22 Claims, 4 Drawing Sheets

(56) References Cited

U.S. PATENT DOCUMENTS

Figures 1, 2:
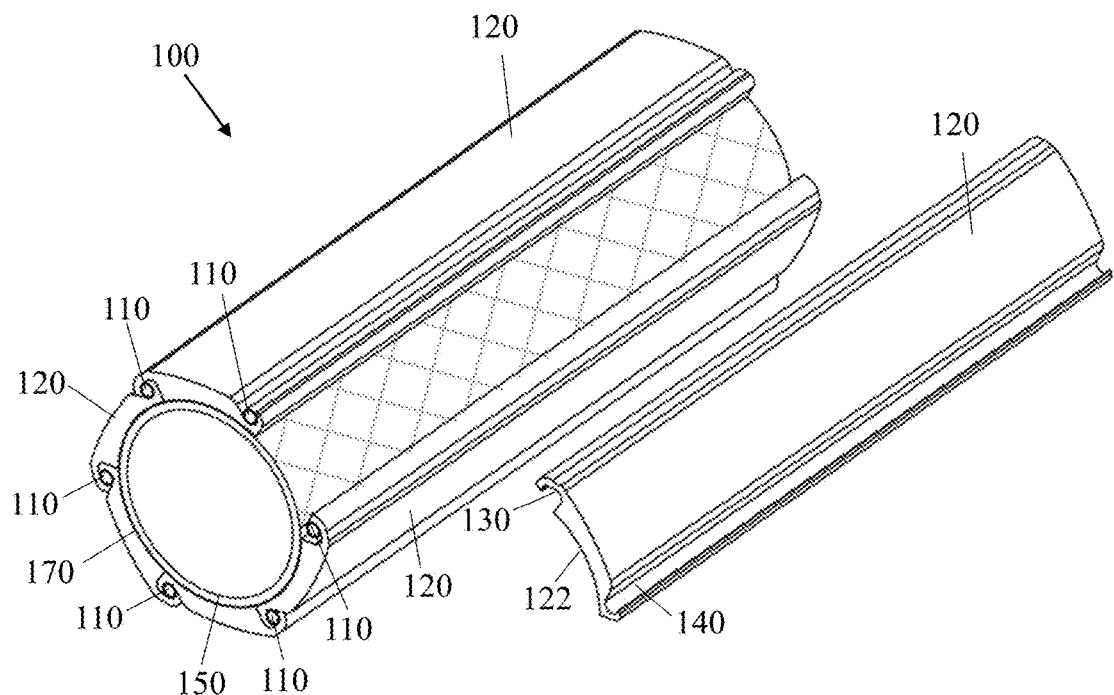

| | | | |
|---|---|---|---|
| 6,595,241 B2* | 7/2003 | Chen | F28D 7/0008 165/96 |
| 8,809,751 B2* | 8/2014 | Ellis | H05B 3/58 219/535 |
| 9,010,407 B2* | 4/2015 | Mackenzie | E03C 1/00 165/170 |
| 11,209,333 B2 | 12/2021 | Bailey | |
| 2003/0209340 A1* | 11/2003 | McClung, III | E21B 36/006 165/45 |
| 2006/0142932 A1 | 6/2006 | Yasui | |
| 2014/0311587 A1 | 10/2014 | Ellis | |
| 2017/0002966 A1 | 1/2017 | Perry | |
| 2017/0332444 A1 | 11/2017 | Dong et al. | |
| 2018/0051539 A1 | 2/2018 | Gerometta et al. | |
| 2021/0148769 A1 | 5/2021 | Forbes et al. | |

FOREIGN PATENT DOCUMENTS

| | | | | |
|---|---|---|---|---|
| GB | 2595338 A | | 11/2021 | |
| IN | 201921048153 A | | 5/2021 | |
| JP | 2003172591 A | * | 6/2003 | F28D 7/0008 |
| WO | 2012170013 A1 | | 12/2012 | |

OTHER PUBLICATIONS

ISA/US, PCT/US2024/021961, Search Report and Written Opinion, Sep. 5, 2024, 11 pages.

* cited by examiner

HEAT TRACING SYSTEM AND METHOD

CROSS-REFERENCE TO RELATED APPLICATIONS

This application claims the benefit of and priority to U.S. Provisional Patent Application No. 63/455,617, filed on Mar. 30, 2023, which is incorporated herein by reference in its entirety.

BACKGROUND

A vital problem related to large-scale piping networks is heating. In the process of controlling large-scale thermal systems, such as steam and electrical heat tracing for pipelines carrying viscous fluid products, many difficulties are encountered. Traditional heat tracing devices do not ensure consistent contact between the tracing tubes and the external process pipe wall. At best, there is a tangential interface between the tracing tubing and the external process pipe wall, which results in less than 5° of the tracing tube's circumference being in point contact with the process pipe. As a result, much of the tracing tube circumference is surrounded by ambient air and a crudely applied bead of heat transfer compound. In traditional steam tracing systems, this configuration results in over-pressurized tracers, adding more tracers than needed, and allowing the flooded tracers themselves to freeze in sustained low-temperature geographic zones.

Additionally, the need for extended-length tracing circuits creates challenges in collecting sensor information, processing temperature data, addressing the multiple uncertainties resulting from ambient temperature transients, variations in the product flow rate, and variations in product temperature. Additionally, there are possible anomalies in the pipeline insulation and improperly drained steam spaces within the steam tracing circuits that significantly increase the complexity of achieving accurate controls. Traditional heat tracing control processes fail to account for many of these difficulties, resulting in inconsistent and inefficient heating in large-scale plant piping networks.

Traditional heat tracing control processes incorporate multiple PID-control loops, which operate based upon the assumption that the controlled plant behaves approximately as a linear-lumped (finite-dimensional) dynamical system with near-constant parameters. In reality, the thermal system is a large-scale distributed system that typically includes nonlinear responses from some of its subsystems.

Furthermore, traditional continuous analog control systems are responsive to temperature feedback from sparsely located single-point temperature transmitters, which results in significant reaction response lag times that may be disastrous in some extreme situations. Specifically, critical instrumentation winterization applications and high heat load demand imposed in sulfur recovery units, crude residual transfer, paraffin storage and transfer, viscous polymers, and especially jacketed piping systems are all subject to circuit "stall" or flooding of the steam heating space with condensate. One reason for flooding is that the response time in conventional steam-heated tracing systems has such extensive lag that the condensing rate of the system momentarily exceeds the response time of the analog temperature control. Consequently, there is an insufficient steam pressure differential across the tracing circuit to displace the condensate from the internal flow area of the small-bore tracing tubing and replace it with live steam. In this scenario, the user applies the sensible heat (heat of the liquid) to the process. Optimally, the enthalpy (latent heat of vaporization) in steam which contains 2-3 times the energy as the liquid, at typically applied pressures of 125 PSIG and below, is the desired heating medium. Consequently, the control system must ensure that adequate pressure is applied to achieve the temperature set point and sufficient pressure differential to ensure proper condensate evacuation from the steam space in the tracer tubing.

Accordingly, there is a need for a heat tracing system with improved heat transfer capabilities between the tracing tubes and the process pipe.

BRIEF DESCRIPTION OF THE DRAWING VIEWS

Figure 3:
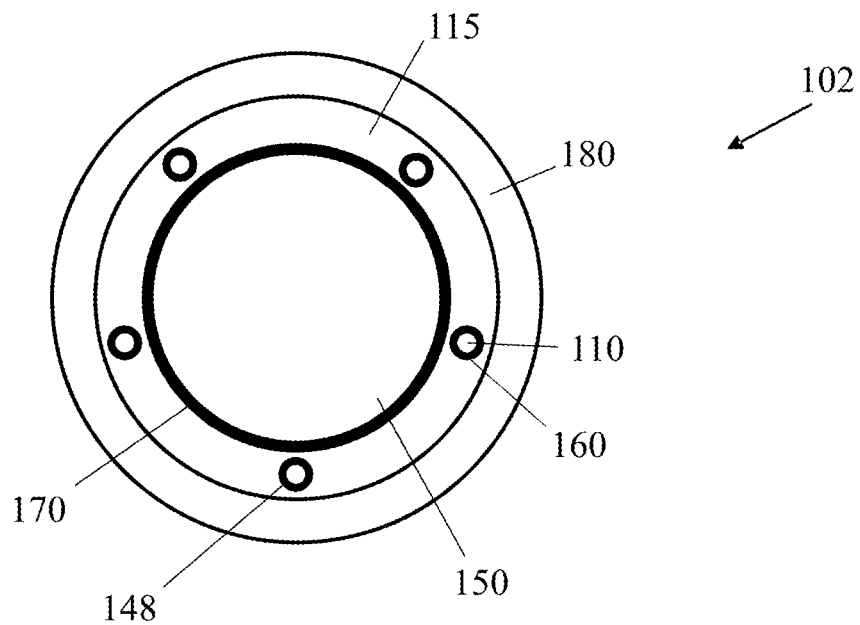
Figure 4:
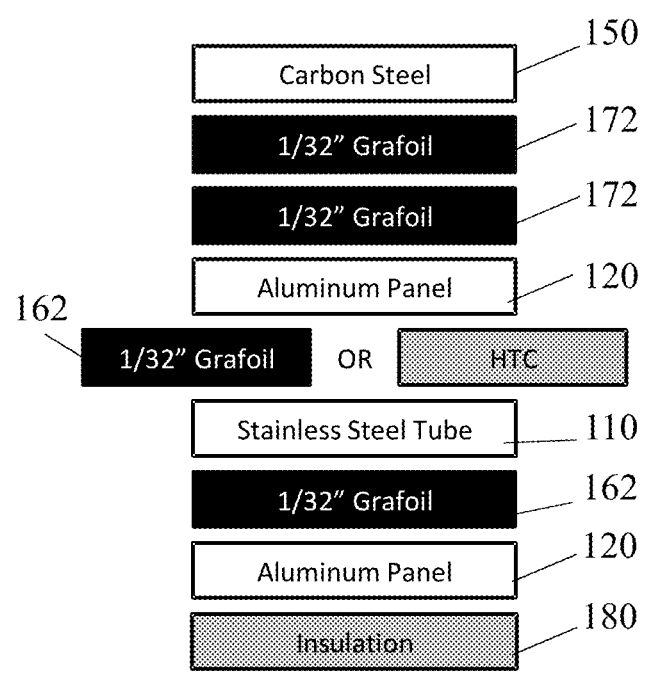
Figure 5:
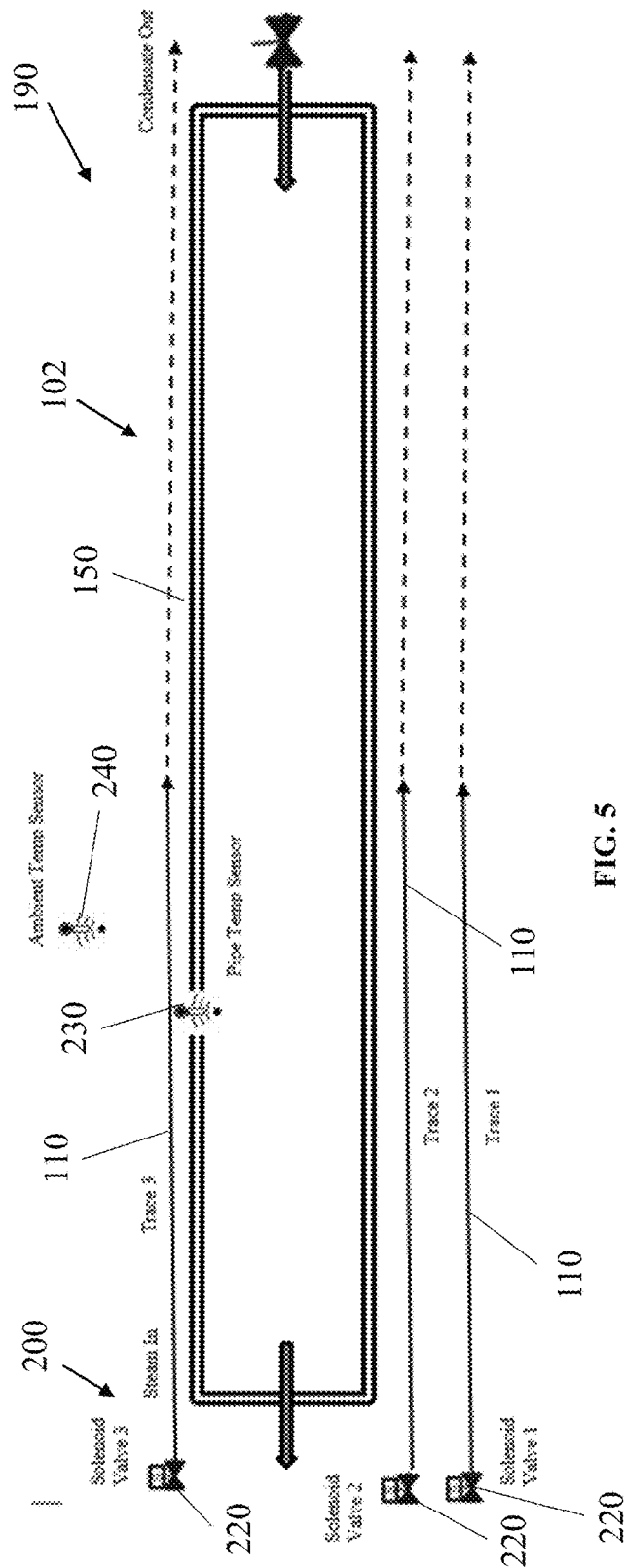
Figure 6:
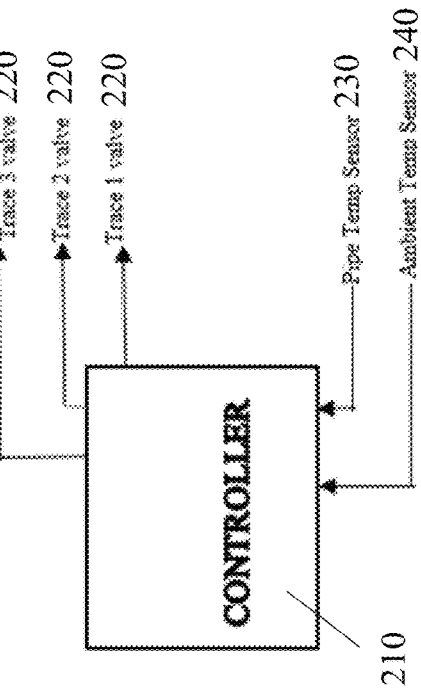
Figure 7:
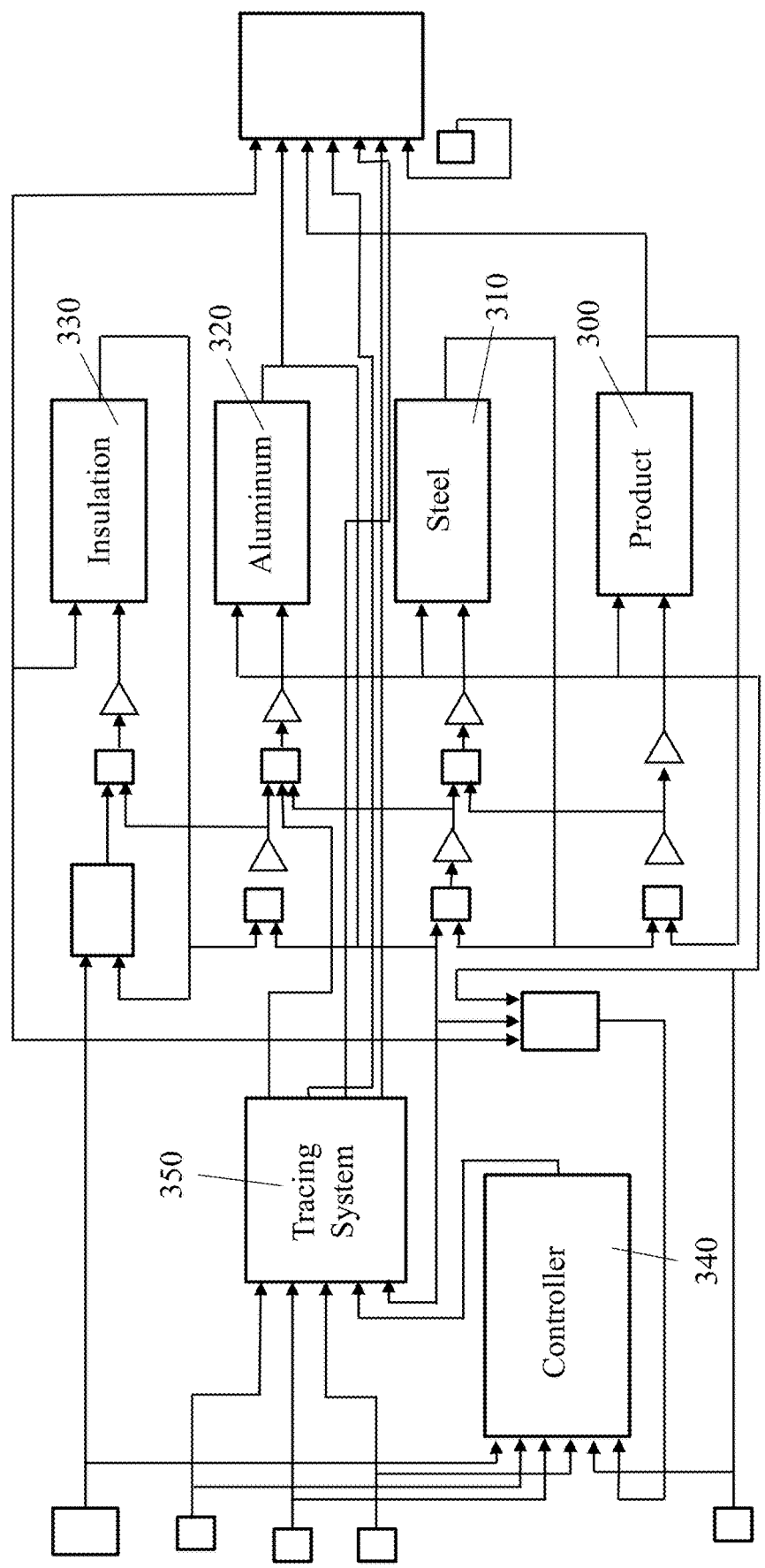

FIG. 1 is a perspective view of a heat tracing assembly.
FIG. 2 is an end view of the heat tracing assembly shown in FIG. 1.
FIG. 3 is a schematic end view of the heat tracing assembly.
FIG. 4 is a schematic illustration of the layers of one embodiment of the heat tracing assembly.
FIG. 5 is a schematic view of a heat tracing system including a heat tracing assembly.
FIG. 6 is a schematic view of a controller of the heat tracing system.
FIG. 7 is a block diagram of one embodiment of a control system for the heat tracing system.

DETAILED DESCRIPTION OF SELECTED EMBODIMENTS

Disclosed herein is a heat tracing assembly, system, and method for pipes and pipelines carrying fluid products, especially viscous fluids. The heat tracing assembly is configured to maximize heat transfer from heat tracing tubes to a centrally positioned process pipe. The heat tracing tubes may carry steam or any other heat source, such as electrical heat, hot oil, other heating mediums, or any combination thereof. The heat tracing assembly may include a compression layer comprising a conductive material. FIGS. 1-7 illustrate select embodiments of the heat tracing assembly, system, and method disclosed herein, with many other embodiments within the scope of the claims being readily apparent to skilled artisans after reviewing this disclosure.

With reference to FIGS. 1 and 2, heat tracing assembly 100 may be selectively secured to process pipe 150. Heat tracing assembly 100 includes one or more tracing tubes 110 and two or more interlocking longitudinal panels 120 all disposed in a generally parallel arrangement around an outer surface of the process pipe 150. The tracing tubes 110 are configured to provide heat to process pipe 150. Interlocking panels 120 may encapsulate tracing tubes 110 and process pipe 150. In some embodiments, the heat tracing assembly 100 may be described as including process pipe 150.

Heat tracing assembly 100 may include a plurality of tracing tubes 110 and a plurality of panels 120. In the embodiment illustrated in FIGS. 1 and 2, heat tracing assembly 100 includes six tracing tubes 110 and six panels 120, but other embodiments of heat tracing assembly 100 include between two and five tracing tubes 110 and the same number of panels 120. Still other embodiments include one or two tracing tubes 110 and two panels 120. The number of interlocking panels 120 may be dependent upon the size of process pipe 150 and/or the number of tracing tubes 110. Each panel 120 may have a length in the range of 3 feet to 20 feet (or any subrange therein) and an overall thickness in the range of 0.0625 inches to 1.5 inches (or any subrange therein).

Each panel 120 may include curved inner surface 122, inner groove 130, and outer groove 140 each extending along the length of the panel 120. Inner groove 130 and outer groove 140 may be formed of reciprocal opposing "J" grooves. Inner groove 130 and outer groove 140 of adjacent panels 120 may together define tubing spaces 148 each configured to house a tracing tube 110. In some embodiments, tubing spaces 148 may have a cross-sectional shape that generally matches a cross-sectional shape of an outer surface of the tracing tubes 110. In the embodiment illustrated in FIGS. 1 and 2, each tracing tube 110 has a cylindrical outer surface, and inner grooves 130 and outer grooves 140 define cylindrical tubing spaces 148 in panels 120.

Tracing tubes 110 may have an outer surface area extending along its length. Tracing tubes 110 may be at least partially disposed within tubing spaces 148 formed by adjacent interlocking panels 120. In some embodiments, at least 75% of the outer surface area of each tracing tubes 110 may be disposed within tubing spaces 148 of panels 120. In alternate embodiments, at least 85%, at least 90%, at least 95%, or all of the outer surface area of tracing tubes 110 may be disposed within tubing spaces 148. In the embodiment illustrated in FIGS. 1 and 2, all of the outer surface area of the tracing tubes 110 may be disposed within tubing spaces 148 of panels 120.

As understood by one skilled in the art, tracing tubes 110 may be any shape. In the embodiments depicted in FIGS. 1 and 2, tracing tubes 110 may be cylindrical tubes having a circular cross-section. In some embodiments, at least 270 degrees of an outer circumference of each tracing tube 110 may be disposed within tubing spaces 148 of panels 120. In the embodiment illustrated in FIGS. 1 and 2, all of the outer circumference (i.e., 360 degrees) of each tracing tube 110 may be disposed within tubing spaces 148 of panels 120. In some embodiments, tracing tubes 110 have diameters in the range of 0.5 inches to 1.5 inches (or any subrange therein).

Still referring to FIGS. 1 and 2, first panel 120a may include outer groove 140a, and second panel 120b may include inner groove 130b. With first panel 120a interlocked with second panel 120b, inner groove 130b and outer groove 140a may completely encapsulate tracing tube 110. The profiles of inner grooves 130 and outer groove 140 may be tapered so as to ensure complete encapsulation of tracing tube 110. Each panel's inner groove 130 may be formed by panel portion 132, tubing portion 134, and end portion 136 of the panel 120, and each panel's outer groove 140 may be formed by base portion 142 and hook portion 144 of the panel 120.

In some embodiments, end portions 136 and/or tubing portions 134 of inner grooves 130 may wrap around and engage a portion of a proximal quadrant of each tracing tube 110. In some embodiments, end portions 136 and/or tubing portions 134 may engage at least 5 degrees of the proximal quadrant, at least 10 degrees of the proximal quadrant, at least 20 degrees of the proximal quadrant, at least 30 degrees of the proximal quadrant, or at least 40 degrees of the proximal quadrant of each tracing tube 110 (or any subrange therein). In this way, end portions 136 and/or tubing portions 134 of inner grooves 130 may wrap partially around a proximal portion of each tracing tube 110, such as by wrapping around 5%-40% of a proximal quadrant of each tracing tube 110 (or any subrange therein) or by wrapping around at least 40% of a proximal quadrant of each tracing tube 110.

In some embodiments, hook portions 144 of outer grooves 140 may wrap around and engage a substantial portion of a distal quadrant of each tracing tube 110. In some embodiments, hook portions 144 may engage at least 50 degrees of the distal quadrant, at least 60 degrees of the distal quadrant, at least 70 degrees of the distal quadrant, at least 80 degrees of the distal quadrant, or at least 85 degrees of the distal quadrant of each tracing tube 110 (or any subrange therein). In this way, hook portions 144 of outer grooves 140 may wrap substantially around a distal portion of each tracing tube 110, such as by wrapping around 50%-85% of a distal quadrant of each tracing tube 110 (or any subrange therein) or by wrapping around at least 85% of a distal quadrant of each tracing tube 110.

Panels 120a and 120b may be interlocked together by engaging the inner groove 130b of panel 120b with the outer groove 140a of panel 120a. In some embodiments, hook portion 144 of outer groove 140a of panel 120a may engage panel portion 132 of inner groove 130b of panel 120b. In the assembled configuration, base portion 142 of outer groove 140 may be disposed between tracing tube 110 and process pipe 150, and base portion 142 may assist with heat transfer between tracing tube 110 and process pipe 150. Tubing portion 134 of inner groove 130 may be disposed around the portion of tracing tube 110 not covered by outer groove 140 and may capture additional heat from tracing tube 110. In this position, end portion 136 of inner groove 130 may engage base portion 142 of the adjacent panel's outer groove 140.

The interlocking configuration of panels 120 may apply a compressive force on process pipe 150. The configuration of panels 120 may also apply a compressive force on tracing tubes 110. In this way, interlocking panels 120 provide a compression layer 115 (shown in FIG. 3). For example, the compressive force that interlocking panels 120 apply on process pipe 150 may be generated, or at least enhanced, by the hook portions 144 of the outer grooves 140 wrapping substantially around the distal portion of each tracing tube 110 and the end portions 136 and/or tubing portions 134 of inner grooves 130 wrapping partially around the proximal portion of each tracing tube 110 (shown in FIGS. 1 and 2). In some embodiments, interlocking panels 120 apply a compressive force in the range of 125 to 300 lbs/force (or any subrange therein) on process pipe 150.

Panels 120 in FIGS. 1 and 2 are formed of a conductive material, which enables the panels 120 to efficiently transfer heat from the tracing tubes 110 to the process pipe 150 and to distribute heat around the outer surface of process pipe 150. Panels 120 may be formed of any conductive material having a heat transfer coefficient sufficient to provide conductive heat transfer between tracing tubes 110 and process pipe 150. In some embodiments, panels 120 are formed of a conductive material having a heat transfer coefficient of at least 2,800 BTU/hr/ft$^2$/° F. and a mechanical strength sufficient to apply a radial compressive force of at least 125 lbs/force on the process pipe 150 to ensure adequate heat transfer and compression. In one embodiment, the conductive material is aluminum. In other embodiments, the conductive material may be copper, graphite, graphene, gold, or platinum.

With reference still to FIGS. 1 and 2, each tracing tube 110 transfers heat to panels 120 by conduction across a first heat transfer interface 160 between the outer surface of the tracing tube 110 and the inner and outer grooves 130, 140 of panels 120. The number of first heat transfer interfaces 160 equals the number of tracing tubes 110. The size of each first heat transfer interface 160 may be dependent on the degree to which tracing tubes 110 are disposed within panels 120. In the illustrated embodiment, each first heat transfer interface 160 extends completely around a tracing tube 110. In alternate embodiments, each first heat transfer interface 160 may extend around 75% of the outer surface area (or 270 degrees around the outer circumference) of tracing tubes 110 along its length. By way of example only, tracing tubes 110 may provide heat to panels 120 via steam or electrical tracing.

Panels 120 transfer heat to process pipe 150 by conduction across a second heat transfer interface 170 between the curved inner surfaces 122 of panels 120 and an outer surface of process pipe 150. The interlocking configuration of panels 120 may apply radial compressive forces on process pipe 150, which enhances the efficiency of heat transfer, and may ensure optimal heat transfer, from the tracing tubes 110 to the process pipe 150 within the heat tracing assembly 100. Panels 120 may be formed of a conductive material having a mechanical strength sufficient to provide radial compression to process pipe 150 without deformation of panels 120.

Heat tracing assembly 100 may include one or more first heat transfer layers 162 disposed within the first heat transfer interfaces 160 and disposed around tracing tubes 110 for facilitating heat transfer from tracing tubes 110 to panels 120. Heat tracing assembly 100 may further include a second heat transfer layer 172 disposed within second heat transfer interface 170 located between panels 120 and process pipe 150 for facilitating heat transfer from panels 120 to process pipe 150.

The first and second heat transfer layers 162, 172 may be formed of a heat transfer material, such as Grafoil, graphene, graphite, aluminum laminate, with a heat transfer coefficient in the range of 30 to 31,000 BTU/hr/ft$^2$/° F. (or any subrange therein), preferably 2,000 to 31,000 BTU/hr/ft$^2$/° F. (or any subrange therein). In one embodiment, the heat transfer compound may be a graphene laminate material. The first and second heat transfer layers 162, 172 may each have a thickness in the range of 0.0625 inches to 2.000 inches (or any subrange therein). For example, the first and second heat transfer layers 162, 172 may each have a thickness of 1/16 inch to 1/8 inch. The first heat transfer layers 162 may assist with conductive heat transfer from tracing tubes 110 to panels 120 by displacing air and filling in surface imperfections between the outer surface of tracing tubes 110, the surfaces of inner grooves 130 of panels 120, and the surfaces of outer grooves 140 of panels 120. Similarly, second heat transfer layer 172 may assist with conductive heat transfer from panels 120 to process pipe 150 by displacing air and filling in surface imperfections between the outer surface of process pipe 150 and the curved inner surfaces 122 of panels 120 as a result of the compressive forces imposed by panels 120. First and second heat transfer layers 162, 172 minimize the presence of air in heat tracing assembly 100, thereby reducing the heat transfer inefficiencies caused by the presence of air in a system, which may decrease heat transfer by nearly 30%.

In the illustrated embodiment, heat tracing assembly 100 includes six interlocking longitudinal aluminum panels 120 that completely surrounded the circumference of six tracing tubes 110. All 360 degrees of the outer surface of tracing tubes 110 are captured for conductive heat transfer to the outer surface of process pipe 150 through the optimized layer of conductive panels 120 that are longitudinally placed upon the process pipe 150.

Referring now to FIG. 3, heat tracing assembly 102 includes compression layer 115 surrounding process pipe 150. Except as otherwise noted, heat tracing assembly 102 has the same features and provides the same functions as heat tracing assembly 100. Compression layer 115 may be formed by interlocking longitudinal panels 120 formed of a conductive material. In other embodiments, compression layer 115 is formed by any other conductive material configuration that surrounds and applies a radial compressive force on process pipe 150 and that provides tubing spaces 148 for housing tracing tubes 110. Compression layer 115 has a thickness that is generally uniform around the circumference of process pipe 150, such as a thickness that varies by less than 40% around the circumference of process pipe 150. Heat tracing assembly 102 may further include insulation layer 180 disposed around compression layer 115. Insulation layer 180 may be formed of a material having a heat transfer coefficient of 1 to 40 ft$^2$·° F.·h/BTU (or any subrange therein). For example, insulation layer 180 may be formed of aerogel or thermal equivalent.

Heat from tracing tubes 110 is transferred by conduction across first heat transfer interface 160 to compression layer 115. The conductive material of compression layer 115 enhances the distribution of heat by conduction across second heat transfer interface 170 to the outer surface of process pipe 150. Insulation layer 180 prevents or reduces heat loss to the environment from heat tracing assembly 102. In some embodiments, tracing tubes 110 provide heat via steam or electrical tracing.

One preferred material option for the heat transfer layers 162 and 172 is Grafoil due to its high overall heat transfer coefficient. Graphene has an extremely high thermal conductivity of 2000-5000 W m$^{-1}$ K$^{-1}$. When suspended in an aluminum matrix and under compressive loading, such as the compressive radial forces generated by interlocking panels 120, Grafoil behaves as an almost homogenous sheet of graphene, which results in an increased heat transfer coefficient. The performance of graphene as a thermal conductor also increased when an increase in the thermal power was supplied to the material. Experimental tests were conducted on different configurations of Grafoil sandwiched between different metal layers and compressed with a mechanical and thermal load applied to it. This was used to validate the heat transfer values obtained from the manufacturer, which were verified with values extrapolated from varying research sources into the material science of graphene as a thermal conductor.

The effectiveness of Grafoil as a heat transfer compound was tested by a comparative analysis. For an invariable control, Configuration A included two layers of aluminum in direct contact. Configuration B included Grafoil compressed between the same two aluminum plates. Configuration A and Configuration B were heated under the same thermal loading until steady state was achieved in each. After 10 minutes of heating the bottom aluminum plate, the top aluminum plate in Configuration A reached a temperature of about 185° F., while the top aluminum plate in Configuration B reached a temperature of about 250° F. Configuration A reached steady state in which the top aluminum plate maintained a temperature of about 290° F. in about 50 minutes, while Configuration B reached steady state in which the top aluminum plate above the Grafoil layer maintained a temperature of about 320° F. in about 50 minutes. These results illustrate the heat transfer enhancement that Grafoil provides when added between two aluminum structures. Specifically, the time required to reach steady state was reduced with the thin layer of Grafoil compressed between two aluminum plates. This confirmed the high thermal conductivity and usability of graphene as a heat transfer material in the heat transfer layers 162, 172.

FIG. 4 shows the layers through which heat is transferred in one embodiment of the heat tracing assembly 102. In the illustrated embodiment, the process pipe 150 is formed of carbon steel having a heat transfer coefficient of 1,238 BTU/(hr-ft$^{2\circ}$ F.), the tracing tubes 110 are formed of stainless steel having a heat transfer coefficient of 225 BTU/(hr-ft$^{2\circ}$ F.), and the compression layer 115 is provided by panels 120 formed of aluminum having a heat transfer coefficient of 2,845 BTU/(hr-ft$^{2\circ}$ F.). This embodiment includes a first heat transfer layer 162 formed of ⅟₃₂ inch Grafoil having a heat transfer coefficient of 30,720 BTU/(hr-ft$^{2\circ}$ F.) and, optionally, a heat transfer cement having a heat transfer coefficient of 30 BTU/(hr-ft$^{2\circ}$ F.) at the first heat transfer interface 160. This embodiment also includes two second heat transfer layers 172 each formed of ⅟₃₂ inch Grafoil having a heat transfer coefficient of 30,720 BTU/(hr-ft$^{2\circ}$ F.) at the second heat transfer interface 170.

Heat from tracing tube 110 is conductively transferred through the first heat transfer layer 162, through the aluminum panels 120, through the second heat transfer layers 172, and to the process pipe 150. In this embodiment, the heat tracing assembly 102 conductively transfers heat and distributes heat from tracing tubes 110 around the process pipe 150 entirely through materials having heat transfer coefficients of at least 2,845 BTU/(hr-ft$^{2\circ}$ F.). Insulation 180 having a heat transfer coefficient of 1.11 BTU/(hr-ft$^{2\circ}$ F.) significantly reduces the heat loss to the environment from heat tracing assembly 102.

Simulations were conducted for a model of heat tracing assembly 100, which included six tracer tubes 110 and six aluminum panels 120, and a model of a clamshell embodiment of heat tracing assembly 102, which included a compression layer 115 formed of two aluminum clamshells each housing three tracing tubes 110. To study the heat transfer across the cross-section of these embodiments, Ansys was used to conduct steady and transient thermal modeling. Both the heat tracing assembly 100 and the clamshell embodiment of heat tracing assembly 102 were modeled with all the layers in FIG. 4 and their appropriate mechanical and thermal properties attributed to the system, each with a fully flooded process pipe 150 and with a half-full process pipe 150. A thermal fine element analysis consisted of six steam tracers 110 to provide a highly symmetrical system that could be changed for different flow conditions or testing variance in the output of the steam tracers 110 and simulate fail conditions. Once the thermal model for the clamshell embodiment of heat tracing assembly 100 was built, it was tested through multiple iterations and determined to be both mesh-independent and repeatable. The physics model was then applied for the optimized panel geometry of heat tracing assembly 100, which included six tracing tubes 110 and six aluminum panels 120. The optimized geometry in heat tracing assembly 100 was slower to achieve the required product temperature conditions than the clamshell embodiment of heat tracing assembly 102. However, this difference was marginal while providing a more evenly distributed thermal profile due to the interlocking aluminum panels 120 in heat tracing assembly 100. The difference in the heating profile of the two embodiments was attributed to material homogeneity—the circular clamshells of the clamshell embodiment of heat tracing assembly 100 had faster heat dissipation because it was a single piece clamp hosting three tracing tubes 110. The interlocking panel design of heat tracing assembly 100 offers better conformity as a modular system for different diameters of process pipes 150 with a relatively small difference in the overall thermal response of the system.

FIGS. 5 and 6 are schematic illustrations of heat tracing system 190, which includes the heat tracing assembly 102 of FIG. 3 and control assembly 200. Heat tracing assembly include product pipe 150 and tracing tubes 110. Control assembly 200 includes pipe temperature sensor 230 configured to measure the temperature of process pipe 150 or the product contained therein, ambient temperature sensor 240 configured to measure the air temperature near process pipe 150, controller 210, and on/off actuators 220. Temperature sensors 230 and 240 are each configured to transmit their respective temperature measurements to controller 210. The on/off actuators 220 are each configured to open or close the flow of heat (e.g., steam or electricity) through one of the tracing tubes 110 in response to an off/off instruction received from the controller 210. The controller 210 is configured to receive temperature measurements from temperature sensors 230 and 240, generate a set of on/off instructions, and transmit the set of on/off instructions to on/off actuators 220. On/off actuators 220 may be solenoid valves or any other valve or actuator configured to open or close the flow of steam or electricity through a tracing tube 110. The on/off instructions generated by the controller 210 use a control algorithm to provide a varying pattern of on instructions to a certain number of tracing tubes 110 and off instructions to the remaining tracing tubes 110, which results in each tracing tube 110 experiencing a full heat or full steam pressure condition or a no heat or dry condition.

The use of on/off actuators 220 in steam tracing embodiments of heat tracing system 190 prevents flooded steam heating loops and optimizes energy spending. Because there is no throttling or steam modulation, the pressure loss across the control valve or temperature regulator is eliminated. Full steam line pressure is allowed to the tracing tubes 110 on a random rotation basis to ensure all circuits are at steam temperature, fully evacuated, and ready for commissioning as the thermal demand requires. The ability to use full line steam pressure from the system with the control process disclosed herein leads to energy savings. The steam pressure does not overshoot the set point. The ability to collect and return the condensate to the boiler is ensured because of higher condensate outlet pressures leaving the tracing circuit. This means the condensate no longer needs to be wasted to grade. In addition, the risk of product solidification in process pipe 150 is mitigated because the system is always on and able to operate within much narrower control temperature ranges. Consequently, the large swings in heating system pressures and temperatures are substituted by continuously switching on/off automatic valves 220 from supplying steam to dry tracing tubes encapsulated in a conductive compression panel 120 that provides complete 360° contact with the traced process pipe 150.

With reference again to FIGS. 5 and 6, a heat tracing method uses heat tracing assembly 102, such as heat tracing assembly 100 including longitudinal panels 120 formed of a conductive material. In some embodiments, the heat tracing method includes assembling the heat tracing assembly 102 by securing the compression layer 115 around the outer surface of process pipe 150 with a plurality of tracing tubes 110 secured within compression layer 115. Compression layer 115 may apply radial compressive forces on the process pipe 150. In some embodiments, assembly also includes positioning one or more heat transfer layers 172 between compression layer 115 and process pipe 150, and positioning one or more heat transfer layers 162 between the tracing tubes 110 and the compression layer 115. Assembly may further include securing insulation 180 around the compression layer 115. On/off actuators 220 may be installed on each tracing tube 110.

The heat tracing method may include providing a heat source flow through the tracing tubes 110 to heat a product flowing through the process pipe 150. Heat is transferred by conduction from the heat source in the tracing tubes 110, through the compression layer, through a process pipe 150, and to the product flowing through the process pipe 150. The controller 210 may provide on/off instructions to the on/off actuators 220 in order to open the flow of the heat source to an on subset of the tracing tubes 110 and to close the flow of the heat source to an off subset of the tracing tubes 110, thereby adjusting the total heat source flowing through all tracing tubes 110 and in turn adjusting the heat transferred to the product in the process pipe 150. The number and location of the tracing tubes 110 in the on subset and the number and location of the tracing tubes 110 in the off subset are adjusted by the controller in order to optimize the heat transfer to the product in the process pipe 150 to achieve a temperature set point and to maintain the temperature set point over a time period.

Experimental tests were conducted on an embodiment of heat tracing system 190 including heat tracing assembly 102 with the layers illustrated in FIG. 4 using the on/off actuators 220. The tests also evaluated a conventional tracing system including fewer steam tracing tubes, each having a larger internal cross-sectional area than the tracing tubes in heat tracing system 190. The conventional tracing system adjusted steam pressure uniformly across all steam tracing tubes instead of using on/off actuators. Heat tracing system 190 had better temperature control and thermal response compared to the conventional tracing system. Heat tracing system 190 had a faster response and higher zonal control accuracy than the conventional tracing system due to the system 190's controller's ability to activate and cycle different combinations of tracing tubes 110. Heat tracing system 190 is also expected to more quickly compensate for larger temperature differences and to maintain a finer threshold limit around the ideal required conditions due to its ability to restrict the number of tracer tubes 110 with more flexibility, thus allowing for higher overall accuracy.

Multiple thermocouples were placed along heat tracing system 190 and along the conventional heat tracing system to study the thermal response at different sections and between material layers. The tests were performed for the same fluid flow conditions for the product and the same steam properties based on temperature and pressure supplied to every tracing tube. The parameters monitored for this test were the inlet and outlet temperatures of the product flowing through process pipe 150, which dictate the metric of interest for a real-world system. The systems were then allowed to run until steady-state thermal conditions were achieved for both the heat tracing system 190 and the conventional heat tracing system. The steady-state analysis of the systems allows for the quantification of system performance and comparative thermodynamic response for mirrored parameters. Heat tracing system 190 achieved a product outlet temperature of 105° F. in 53 minutes, while the conventional heat tracing system achieved the same product outlet temperature of 105° F. in 74 minutes. Heat tracing system 190 had a significant advantage in the heat-up process and achieved a steady state before the conventional heat tracing system under the same conditions. The faster response also highlights the ability of heat tracing system 190 to compensate for environmental changes or component failure. This is coupled with the advantage of the scalability of the heat tracing system 190. The number of tracing tubes 110 can be increased or decreased based on the requirement allowing for added redundancy and higher efficiency of the active heating.

In some embodiments, controller 210 of heat tracing assembly 190 is configured to generate on/off instructions for the various on/off actuators 220 based on a sliding mode control algorithm. The sliding mode control algorithm accounts for anomalies, such as rain or other ambient temperature fluctuations. The on/off instructions for the on/off actuators 220 are based on multiple switching functions implementing a sliding mode control algorithm in the system 190. In this embodiment, the switching functions use estimated heat distributions from an observer/digital twin rather than direct measurements from the thermocouples or other sensors. This makes the closed-loop tolerant of sensors' faults and predicts minimums and maximums of the temperature variations between the measurement points.

Process piping systems that require heat tracing may have a different configuration with horizontal and vertical turns, changes of elevation, etc. The product flow entering the piping system may also have significant variations in temperature and flow rate. As a result, the product flow may not necessarily fill the pipe. In addition, the ambient temperature, insulation quality, and possible anomalies/damage may significantly affect the temperature distribution along the system length and the cross-section. To obtain a complete picture of the temperature distribution in the system while only applying a small number of temperature sensors, a heat tracing control system disclosed herein may use a real-time virtual model in which the state is continuously updated using information from the temperature sensors, also known as a digital twin/state observer.

The main thrust of the state observer's theory for the last 30 years attempts to generalize the linear observer for nonlinear systems and distributed parameters described by partial differential equations (PDEs). The theory of nonlinear observer advancement became possible because of theoretical achievements in the sliding mode technique. This technique estimates the system state despite the disturbances (or anomalies). The rigorous mathematical description of such systems requires a nonstandard understanding of the solution of differential equations and corresponding modifications of Lyapunov stability theory. While the nonlinear sliding mode observers improve the performance of the state estimator and reduce their disturbance dependence in each task, the underlying mechanisms of the disturbance suppression can be explained. The mechanisms implicitly estimate the disturbance and then compensate it in finite time. The mechanisms are used not only for state estimation, but to obtain information about the anomaly. The knowledge of the anomaly is then used to update the model, creating a system with self-adaptation equipped with artificial intelligence features.

In the disclosed control system, the model is distributed and, in some parts, nonlinear. It addresses a complete collection of modeling variables including: (1) the heat flow model along the product pipe length; (2) the multilayered cross-sectional heat propagation through the wall of the product carrying steel pipe, the heat transfer mastic layer, the aluminum casing that encapsulates the tracing tubes, and the steam tracing circuit tube wall; (3) the tracing heat input (and in the case of steam tracing, steam condensation model); (4) the heat loss to the environment through the insulation; and (5) the dynamic variable flow of the product carrying heat energy in both partial and filled process piping.

The disclosed control system utilizes the digital twin/state observer for such a complex model with internal feedback loops that incorporate sparse temperature measurements to make the distributed system state converge to the state (temperature field) of the plant.

Some control systems combine a continuous controller, such as a PID, with pulse width modulation (PWM). PWM allows the actuator continuous action via variation of the duty cycle of rectangular pulses, thus making it possible to implement (approximately) equivalent continuous action using the on/off the actuator.

Sliding mode control is an alternative to PWM. Unlike continuous control with PWM, the sliding mode control "naturally" implements equivalent continuous closed-loop dynamics by utilizing specially designed switching functions to represent constraints between the system state variables. For example, in a classical second-order system such as mass-spring-damper, the switching function can be chosen as a linear combination of the position error (from the desired position) and the velocity. Depending on the sign of a combination, the actuator is on or off. As a result, the controls switching with the highest allowable frequency, the average value of this linear combination is close to zero (the higher the allowed frequency of such switching is higher the accuracy). The constraint relation between the position and the velocity means the system order reduces from two to one. The constraint describes the system behavior. The result is a good robustness property of the closed-loop system. As shown in the theory of sliding mode, the equivalent value of the control includes terms automatically canceling the disturbance without the need to measure it. The closed loop becomes insensitive to the model parameter variations and external disturbances, which is advantageous compared with PID+PWM.

The typical plots of the sliding mode control switching are between +10 and −10 with 100 Hz with the unknown disturbance. The equivalent value (obtained by the low pass filter of the control) is out of phase with the disturbance, thus canceling it automatically.

In a more general multidimensional system after its state is constrained to a lower-dimensional manifold (defined by the switching function) is said to be moving in sliding mode. It characterizes the same as in the described second order example by high-frequency switching of the control variables and robustness of the closed loop. As can be understood from this explanation, the implementation of the sliding mode control requires information regarding the state variables, not only the system output. The state observer/digital twin may be a way to estimate the system state by using only partial measurements from a few sensors.

In one embodiment, the controller of the heat tracing control system utilizes the system state, which is distributed. The system state includes the following: (a) dynamically changing temperature fields of the piping+tracing system components, such as flowing product carrying heat from the upstream part of the system; (b) a product carrying steel pipe and its heat distribution along the system length; (c) aluminum casing temperature field in longitudinal and radial directions tracing circuits; (d) flowing steam condensation parameters; and (e) heat propagation through the insulation to the environment. This distributed state (a)-(f) is then utilized in the sliding mode switching functions to turn valves on and off in optimal coordination of multiple tracing circuits surrounding the product pipe. The system is implemented in software written in Python programming language. Simulink was also used to verify and tune up the control system.

FIG. 7 is a Simulink block diagram of one such embodiment of the heat tracing control system. The four blocks on the right represent the longitudinal heat distribution of each four layers respectively: (1) the product flow 300; (2) the steel pipe 310; (3) the aluminum casing containing tracing tubing 320; (4) the insulation 330. All blocks are based on dynamic (not steady-state) PDE models of heat propagation. On the left, block 350 is the model of the steam condensation in the tracing tubes and block 340 is the controller. The controller contains an observer/digital twin based on the same PDE models of the layers shown in FIG. 4. The actual on/off control signals for the tracing valves are based on multiple switching functions implementing a sliding mode control algorithm in the system. The switching functions use estimated heat distributions from the observer/digital twin rather than direct measurements from the thermocouples or other sensors. This makes the closed-loop tolerant of sensors' faults and predicts minimums and maximums of the temperature variations between the measurement points.

Prototype testing was conducted to implement the sliding mode control and obtain performance metrics that highlight the repeatability and accuracy of the system. The test setup included five steam tracing tubes 110 around a process pipe 150 with flowing water to simulate product flow at room temperature. The tracing tubes 110 were connected to individual solenoid valves while fed steam at 25 psi. The solenoid valves are nominally closed when energized. The operation of the algorithm was quantified with tests. A single temperature set point at 97° F. was used until a steady state was achieved, or the system oscillated around the set point by very minute margins. The sensor used as a reference by the controller 210 was a surface temperature sensor, which was placed on an aggregate point of the setup to represent the product temperature within a process pipe 150. Other thermocouples measured the upstream, downstream, condensate, tracer, and temperature. The data was sampled every 3 seconds. Time steps were logged until the test program was terminated by the operator.

Three tests were conducted. The first test sought to validate the steady-state convergence of the system. The heat tracing system 190 had a total overshoot of under 10° F. and started returning towards the set point as the control logic cycled the solenoid valves. The thermal set point was reached just before 50 minutes. Upon reaching the set point, the controller 210 then attempted to maintain the temperature by cycling on/off instructions to different tracing tubes 110 by varying the location of the active tracing tube 110 and the number of tracing tubes 110 turned on at a time. The data showed that the temperature difference had a maximum undershoot of less than 1° F. as the system responded to new variance in the temperature.

The second test evaluated how the system 190 and controller 210 behave over multiple periods of steady-state fluctuation. As with the previous test, the initial overshoot and reduction to the set point were attained within 50 minutes. Following the first control cycle, the system hovered within +1.5° F. and −0.5° F. of the set point. As the test proceeded, the overshoot decreased with each system cycle, continuously reducing the overall temperature difference from the set point. The controller actively cycled multiple tracing tubes 110, adaptively changing the number of tracing tubes 110 by them turning on and off and rotating them in a circular pattern to evenly distribute heat in the system.

The third test was conducted with the control performance and sensor feedback until the system improved. The overshoot and convergence to the same set point as the first and second tests was achieved in only 700-time steps (about 36 minutes). An improvement of approximately 30% compared to the previous tests where the same condition was achieved in about 1000-time steps (about 50 minutes). The tests also demonstrated an extended period of the switching logic working and the temperature difference around the 1800-time step mark is negligible. The system was adapting and compensating accurately to maintain the temperature. The valve actuation pattern shows how the system behaved differently for each period of steady-state fluctuation. By predicting the system response using the observer, the controller 210 optimizes the system 190 to achieve the steady state and maintain it consistently. Also, the system response improved with higher fidelity sensors, which provided much more accurate data allowing the controller 210 and observer to perform better.

As used herein, "proximal quadrant" means (i) for a tracing tube having a circular cross-section: a quadrant arc (i.e., an arc of 90 degrees) along a tracing tube's outer surface that has one end point that is the closest point to the process pipe along the tracing tube's outer surface; and (ii) for a tracing tube having a non-circular cross-section: an outer surface of a quadrant of the tracing tube between an x-axis and the process pipe, wherein the quadrant is defined by the x-axis, which intersects a midpoint of the tracing tube's height, and a perpendicular y-axis that intersects a central point of the process pipe.

As used herein, "distal quadrant" means (i) for a tracing tube having a circular cross-section: a quadrant arc (i.e., an arc of 90 degrees) along a tracing tube's outer surface that has one end point that has a 90 degree separation from the closest point to the process pipe along the tracing tube's outer surface; and (ii) for a tracing tube having a non-circular cross-section: an outer surface of a quadrant of the tracing tube, wherein the quadrant is defined by an x-axis that intersects a midpoint of the tracing tube's height and a perpendicular y-axis that intersects a central point of the process pipe, wherein the x-axis is positioned between the quadrant and the process pipe.

Each device described in this disclosure may include any combination of the described components, features, and/or functions of each of the individual device embodiments. Each method described in this disclosure may include any combination of the described steps in any order, including the absence of certain described steps and combinations of steps used in separate embodiments. Any range of numeric values disclosed herein includes any subrange therein. "Plurality" means two or more. "Above" and "below" shall each be construed to mean upstream and downstream, such that the directional orientation of the device is not limited to a vertical arrangement.

While preferred embodiments have been described, it is to be understood that the embodiments are illustrative only and that the scope of the invention is to be defined solely by the appended claims when accorded a full range of equivalents, many variations and modifications naturally occurring to those skilled in the art from a review hereof.

I claim:

1. A heat tracing assembly for heating a product in a process pipe, comprising:
    a plurality of interlocking longitudinal panels, wherein each of the panels includes a curved inner surface, an inner groove, and an outer groove; wherein in an assembled configuration a plurality of tubing spaces are defined by the inner groove and the outer groove of adjacent longitudinal panels; and wherein the longitudinal panels are configured to completely encapsulate and exert a compressive force on an outer surface of the process pipe; and
    a plurality of tracing tubes each disposed within one of the tubing spaces.

2. The heat tracing assembly of claim 1, wherein the tubing spaces completely encapsulate an outer circumference of the tracing tubes.

3. The heat tracing assembly of claim 1, wherein the outer groove of each panel includes a base portion and a hook portion; wherein the hook portion wraps at least 50% around a distal quadrant of the tracing tube.

4. The heat tracing assembly of claim 3, wherein the inner groove of each panel includes a panel portion, a tubing portion, and an end portion; wherein the end portion or the tubing portion wraps partially around a proximal portion of the tracing tube.

5. The heat tracing assembly of claim 4, wherein the hook portion of the outer groove of each panel is disposed within the inner groove of the adjacent panel and engages the panel portion of the inner groove.

6. The heat tracing assembly of claim 1, further comprising a heat transfer layer disposed along the curved inner surfaces of the panels.

7. The heat tracing assembly of claim 1, further comprising a heat transfer layer disposed around each of the tracing tubes.

8. A heat tracing assembly for heating a product in a process pipe, comprising:
    a compression layer comprising a plurality of interlocking longitudinal panels each formed of a conductive material, wherein each of the longitudinal panels comprises a curved inner surface, an inner groove, and an outer groove, with the outer groove comprising a base portion and a hook portion; wherein in an assembled configuration a plurality of tubing spaces are defined by the inner groove and the outer groove of adjacent panels; and
    one or more tracing tubes, wherein each of the tracing tubes is disposed within one of the tubing spaces, with the hook portion of the longitudinal panel wrapping at least 50% around a distal quadrant of the tracing tube such that at least 75% of an outer surface area of each of the tracing tubes is encapsulated by the inner groove and the outer groove of adjacent panels.

9. The heat tracing assembly of claim 8, wherein the compression layer is configured to completely encapsulate an outer surface of a process pipe.

10. The heat tracing assembly of claim 9, wherein the compression layer is configured to exert a compressive force on the process pipe.

11. The heat tracing assembly of claim 8, wherein all of the outer surface area of each of the tracing tubes is encapsulated by the inner groove and the outer groove of adjacent panels.

12. The heat tracing assembly of claim 8, wherein the tracing tubes are cylindrical tubes, wherein at least 270 degrees of an outer circumference of each of the tracing tubes is encapsulated by the inner groove and the outer groove of adjacent panels.

13. The heat tracing assembly of claim 12, wherein the compression layer completely encapsulates the outer circumference of each of the tracing tubes.

14. The heat tracing assembly of claim 8, wherein the inner groove of each panel includes a panel portion, a tubing portion, and an end portion; wherein the end portion or the tubing portion wraps partially around a proximal portion of the tracing tube.

15. The heat tracing assembly of claim 14, wherein the hook portion of the outer groove of each panel is disposed within the inner groove of the adjacent panel and engages the panel portion of the inner groove.

16. The heat tracing assembly of claim 8, further comprising a heat transfer layer disposed along an inner surface of the compression layer.

17. The heat tracing assembly of claim 8, further comprising a heat transfer layer disposed around each of the tracing tubes.

18. The heat tracing assembly of claim 8, further comprising an insulation layer encapsulating the compression layer.

19. A heat tracing system for heating a product in a process pipe, comprising:
   a compression layer formed of a conductive material;
   one or more tracing tubes each having an outer surface area, wherein at least 75% of the outer surface area of each of the tracing tubes is disposed within the compression layer;
   a plurality of on/off actuators configured to open or close a heat source flow through one of the tracing tubes; and
   a controller configured to transmit on/off instructions to the on/off actuators, wherein the controller generates the on/off instructions using a sliding mode control algorithm.

20. A heat tracing assembly for heating a product in a process pipe, comprising:
   a plurality of interlocking longitudinal panels, wherein each of the panels includes a curved inner surface, an inner groove, and an outer groove; wherein the outer groove of each panel includes a base portion and a hook portion; and wherein in an assembled configuration a plurality of tubing spaces are defined by the inner groove and the outer groove of adjacent longitudinal panels; and
   a plurality of tracing tubes each disposed within one of the tubing spaces, wherein the hook portion of the outer grove wraps at least 50% around a distal quadrant of the tracing tube.

21. The heat tracing assembly of claim 20, wherein the inner groove of each panel includes a panel portion, a tubing portion, and an end portion; wherein the end portion or the tubing portion wraps partially around a proximal portion of the tracing tube.

22. The heat tracing assembly of claim 21, wherein the hook portion of the outer groove of each panel is disposed within the inner groove of the adjacent panel and engages the panel portion of the inner groove.

* * * * *